Dec. 5, 1967    H. L. PHILIPPE    3,356,332
ADJUSTABLE NIPPLE COUPLING FOR A FLUSH VALVE
Filed Oct. 5, 1964    2 Sheets-Sheet 1

INVENTOR.
Howard L. Philippe
BY Dressler, Goldsmith, Clement, Gordon & Todd
ATTORNEYS.

Dec. 5, 1967                  H. L. PHILIPPE                  3,356,332
ADJUSTABLE NIPPLE COUPLING FOR A FLUSH VALVE
Filed Oct. 5, 1964                                          2 Sheets-Sheet 2
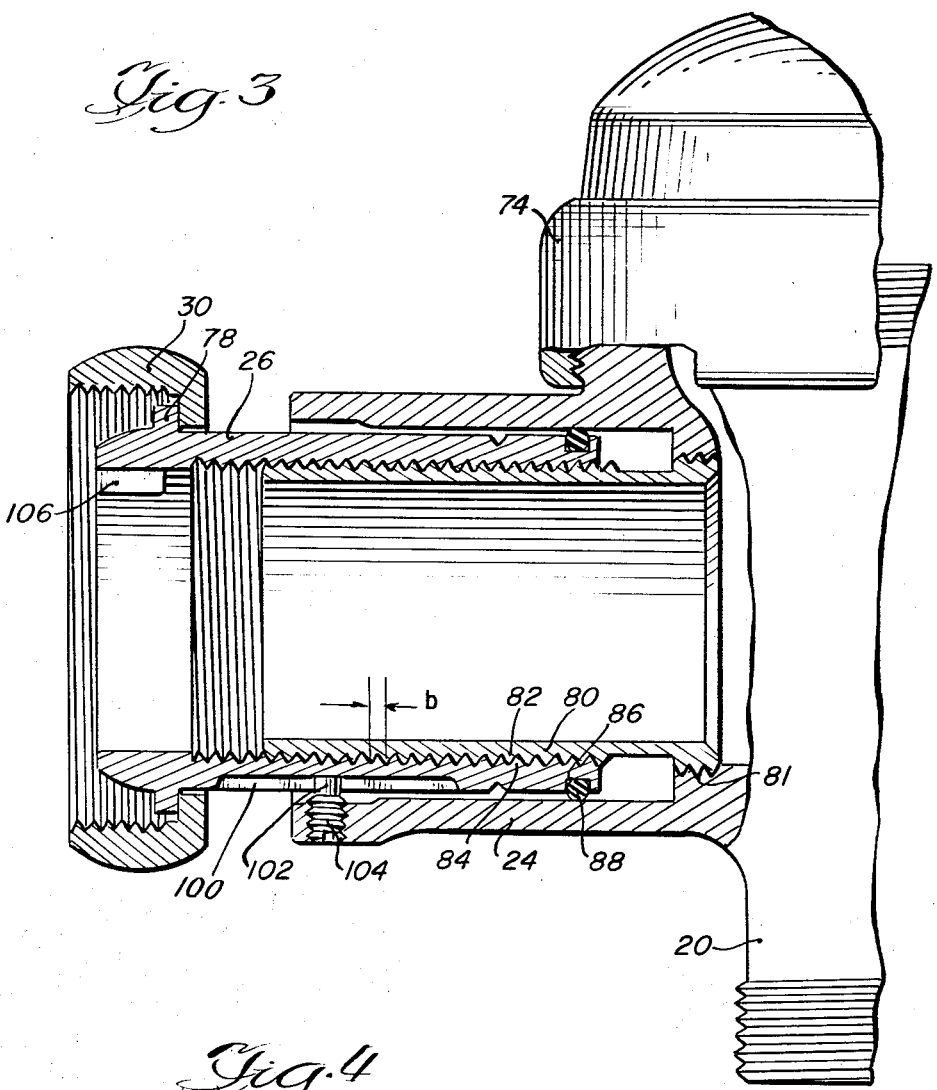
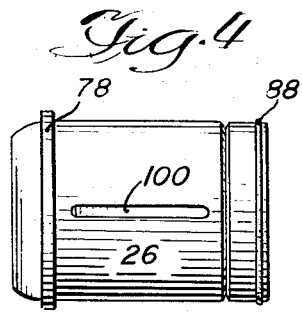
INVENTOR.
Howard L. Philippe
By Dressler, Goldsmith, Clement, Gordon & Ladd
ATTORNEYS.

United States Patent Office

3,356,332
Patented Dec. 5, 1967

3,356,332
ADJUSTABLE NIPPLE COUPLING FOR
A FLUSH VALVE
Howard L. Philippe, Chicago, Ill., assignor to Watrous,
Inc., a corporation of Delaware
Filed Oct. 5, 1964, Ser. No. 401,516
13 Claims. (Cl. 251—150)

This invention relates to flush valves, and particularly, to a flush valve with an adjustable coupling at the inlet portion.

In toilet installations, it is necessary for the plumber to provide a hole in the bathroom wall for the inlet pipe extension which is connected to the flush valve, and to provide a hole in the floor or wall to receive the outlet pipe from the bowl. This process, generally designated as "roughing-in," ordinarily required that the wall hole be laterally offset from the floor hole by a distance of 4¾ inches.

It is difficult to properly precisely locate the wall and floor holes and in many instances the holes have been inaccurately drilled by the roughing plumber. When the inaccuracy is great, it may be necessary to enlarge one of the wall holes or to relocate one of the holes and patch the floor or wall. Such an installation may be quite unsightly.

If the holes are inaccurately located, an incorrect fit between the flush valve and the bowl may occur. This could result in leakage or, even worse, the vacuum breaker, which has a weak section, may be fractured.

The use of an adjustable inlet coupling has been tried to obviate the foregoing difficulties. In many instances, however, the adjustable coupling has been found to leak, due to loosening thereof or other inherent structural difficulties.

Other problems accrue in the employment of adjustable inlet couplings. For instance, when pressure is applied to the flush handle by the operator, an unbalancing force is exerted at the inlet and outlet coupling of the flush valve. If the inlet coupling is weak, the force can cause the valve to break at the vacuum breaker coupling to the outlet of the flush valve, particularly when a relatively long vacuum breaker is used. It is thus necessary that the coupling at the inlet section of the valve be rigid to securely retain the flush valve during operation of the handle.

Further, in prior installations where an adjustable coupling was employed, two separate measurements were necessary, a first measurement of the lateral distance between the center of the wall hole and the center of the floor hole and a second measurement of the distance between the valve outlet center and the center of the inlet elbow pipe coupling. These measurements were required because the couplings had to be adjusted prior to mounting and installation of the valve.

The above disadvantages are alleviated by the flush valve assembly and adjustable nipple coupling of the present invention. Flush valves embodying the invention have a valve casing provided with an inlet portion and an outlet portion and contain suitable valve assembly and an actuating mechanism for operating the valve. An extendible coupling is connected to the inlet wall of the casing and is retained in a set position with respect thereto. In one embodiment of the invention the coupling is retained in a set position by means of a set screw which is connected to the inlet wall and accessible from outside the wall.

The coupling arrangement of the invention includes a nipple having an outside thread connected to and at least partially located within the inlet wall of the casing, and an extendible coupling engaging the nipple, comprising a generally cylindrical body having an inside thread to engage with the nipple thread, and an annular exterior groove on the body which receives a sealing ring to prevent leakage. A recess is formed on the exterior of the coupling body for receiving the aforementioned set screw. In a preferred embodiment of the invention the nipple and coupling body threads are formed at a predetermined distance whereby the distance of extension due to a full rotation of the coupling can be gauged simply by the roughing plumber.

An annular flange is provided for retaining an inlet pipe coupling which extends from the coupling body, and a lug is connected to the inside of the coupling body for enabling a positive grasp thereof.

The abovementioned features and other elements of the invention by which the advantages are attained are described in greater detail in the following specification taken in conjunction with the accompanying drawings which illustrate an embodiment of the invention and in which:

FIG. 3 is an enlarged fragmentary sectional view of the adjustable coupling of the present invention; and FIGURE 4 is a bottom view of the coupling body thereof.

Figure 1:
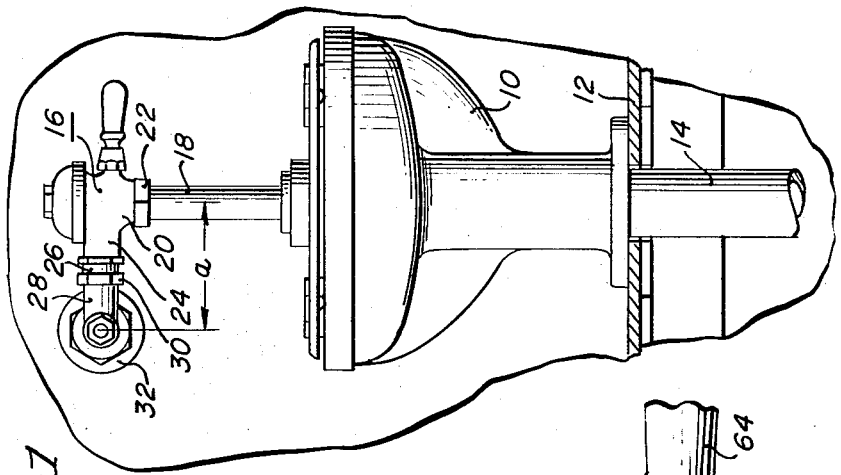
FIGURE 1 is a front elevation of a toilet installation with a flush valve assembly of the present invention assembled thereto.

In FIGURE 1 a toilet bowl 10 is shown affixed to the floor 12 through which outlet pipe 14 extends. A flush valve, generally designated as 16 is shown connected to the bowl 10 via a vacuum breaker 18 which is affixed to the outlet wall 20 of the flush valve by means of a slip joint nut 22. Water enters the flush valve 16 at its inlet wall 24 through an adjustable coupling 26. The flush valve assembly is attached to the wall by means of elbow 28 which threadingly engages inlet pipe coupling 30. The inlet pipe extends through the wall and threadably engages a coupling unit which is attached to the elbow 28. The inlet pipe is surrounded by a flange 32 which abuts the wall to provide an attractive appearance.

Conventionally, the distance *a* between the elbow center and the flush valve center is 4¾ inches. The flush valve of the present invention however, includes an extendible nipple-coupling whereby the flush valve can be properly positioned even if the roughing plumber has drilled a hole which does not exactly correspond to distance *a*.

Figure 2:
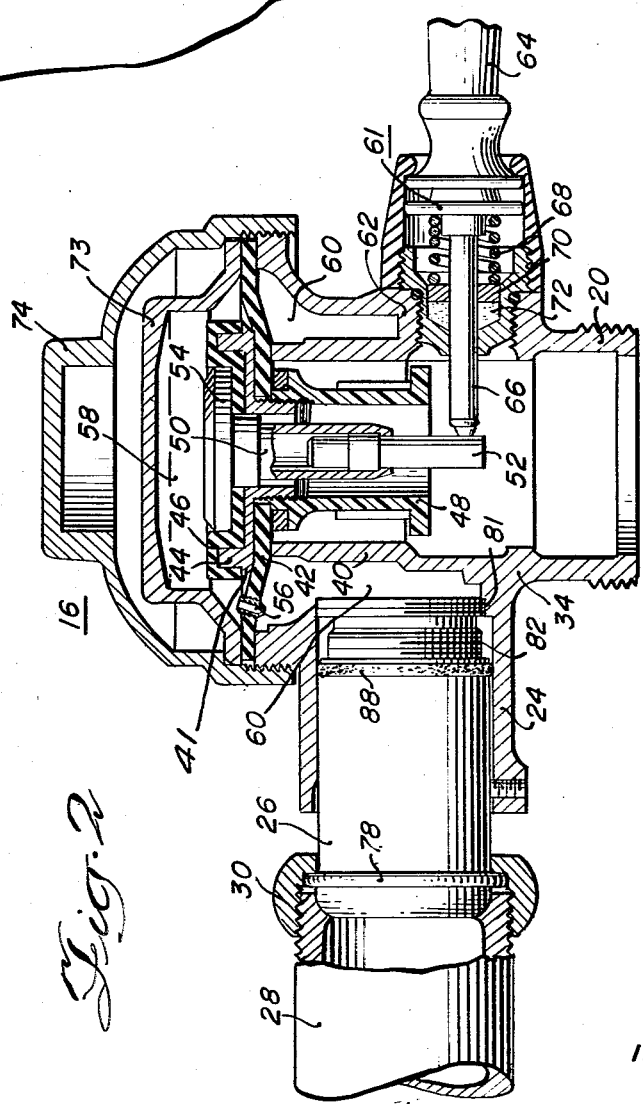
FIG. 2 is a vertical sectioned view of the flush valve assembly of the present invention.

A more detailed diagram of the flush valve assembly is shown in FIGURE 2 in which the flush valve 16 is depicted comprising a valve casing 34 having an inlet wall 24, an outlet wall 20 and a generally cylindrical valve seat 40. A diaphragm assembly 41 including a diaphragm 42 and a relief valve seat 46 with a brass insert 44 rests upon the valve seat 40. A plastic relief valve guide 48 threadably engages the insert 44 and within the relief valve guide is a relief valve 50 including relief valve stem 52 and head 54 which rests upon the relief valve seat 46. The diaphragm 42 has a bypass opening 56 which is adapted to communicate with the upper chamber 58 and the lower chamber 60.

A valve actuating apparatus 61 threadably engages the wall 62 of the flush valve casing. The actuating apparatus includes a handle 64, a plunger 66 which engages the relief valve stem 52, a spring 68, a sleeve 70 and resilient packing 72.

An inside cover 73 which defines the upper chamber 58 is nested upon diaphragm 42. The valve casing is closed by means of a valve cover 74 which threadingly engages the valve casing.

Before the flush valve is operated there is equal water pressure in upper chamber 58 and lower chamber 60. When the handle 64 is operated, plunger 66 tilts and opens the relief valve 50, thus relieving the pressure in the upper chamber 58. The main operating unit, including relief valve 50, diaphragm 42, relief valve seat 46 and insert 44 are raised due to the greater pressure in the lower chamber 60 and water is allowed to flow from the inlet pipe through the valve outlet. When the main operating unit is raised to its maximum level, relief have stem 52 is in a position above plunger 66 and the relief valve 50 is closed. The water pressure increases in the upper chamber 58 by a flow of water through the bypass opening 56. As the pressure in the upper chamber increases, the operating unit is lowered due to the greater exposed area in the upper chamber.

The adjustable coupling 26 connecting the inlet pipe to the valve is located within the inlet wall 24 as seen in FIGURE 2. A portion of the inlet elbow 28 is connected to the coupling 26 by a threaded engagement with an inlet pipe coupling 30. The inlet pipe coupling is retained by means of an annular flange 78 which extends from the coupling 26.

A more detailed view of the adjustable coupling of the present invention is shown in FIGURE 3 in which a generally cylindrical nipple 80 is shown threadably engaging, at 81, the inlet wall 24 of the valve casing. For extra security the joint 81 is soldered or brazed.

The nipple 80 has an outside thread 82 which engages the inside thread 84 of generally cylindrical extendible coupling 26. An annular groove 86 is provided on the extendible coupling 26 and a sealing ring 88 is retained within the groove. The sealing ring 88 in the form of an O-ring, comprises a resilient material which contacts the inside of the inlet wall 24 and effectively prevents leakage from the inside of the system.

The annular flange 78 encircles the coupling 26 and may be formed integral therewith. The flange 78 is adapted to retain the input pipe coupling 30 which has an inner thread to engage an inlet elbow 28.

As shown most clearly in FIGURE 4, a recess 100 is formed on the coupling body 26. This recess is adapted to receive key 102 of a set screw 104 which engages an aperture formed in the inlet wall 24.

As is evident from the foregoing description and drawings, coupling unit 26 can be extended by turning it with respect to the nipple 80. A lug 106 is provided to aid in the grasping of the coupling 26. When the coupling is to be extended, the set screw 104 is loosened so that the key 102 disengages the recess 100 and the coupling is turned until the proper extension is achieved. At this time the set screw 104 is turned so that its key engages recess 100 of the coupling 26.

The set screw and recess expedient provide a great amount of security whereby the flush valve will be unable to tip with respect to the inlet pipes when a force is applied to the handle by the operator. Further, the set screw prevents the installed coupling from turning and thereby provides a greatly stabilized construction.

In a preferred embodiment the threads are spaced by a predetermined distance $b$. In this manner the extension of the coupling is gauged whereby the roughing plumber will know the extended distance by merely counting the number of full turns of the coupling 26. As a specific example, a spacing of about 1/8 inch between each thread has been found effective.

The flush valves of the present invention will generally be shipped with the coupling in its conventional position, for example, at a distance so that the elbow center and outlet center are spaced 4¾ inches. If the roughing-in was miscalculated, the roughing plumber can grasp the lug 106 and can extend the coupling to a proper distance at a rate of 1/8 inch per revolution. The novel construction of the present invention provides an efficient, leak proof device in which the adjustable coupling is securely retained.

Although a specific flush valve has been shown, it should be noted that the adjustable coupling of the present invention can be used with many different types of flush valve constructions and the present invention is not limited to the specific valve shown herein. In any installation where an adjustable coupling having a secure fit and a predetermined extensible distance is required, the flush valve of the present invention will be found useful.

It will be understood that various modifications and substitutions and changes in the detail and form of the device illustrated and in its operation may be made by those skilled in the art without departing from the spirit of the invention.

I claim:

1. A flush valve casing having an inlet portion and an outlet portion, a nipple connected to and at least partially enclosed within the wall of said casing which defines said inlet portion, an extendible nipple-coupling engaging said nipple, means for connecting said nipple-coupling to said nipple, sealing means connected between said nipple-coupling and said wall, and means for retaining said extendible nipple-coupling in a set position with respect to said inlet wall, said retaining means being connected to said inlet wall and accessible from outside said wall.

2. A flash valve casing having an inlet portion and an outlet portion, a nipple connected to and at least partially enclosed within the wall of said casing which defines said inlet portion, said inlet casing wall having an aperture therein, an extendible nipple-coupling engaging said nipple, means for connecting said nipple-coupling to said nipple, sealing means connected between said nipple-coupling and said wall, and means for retaining said extendible nipple-coupling in a set position with respect to said inlet wall, said retaining means comprising a set screw engaging the wall which defines the aperture in said inlet wall, said set screw having a projection extending therefrom adapted to communicate with a recess formed on said nipple-coupling.

3. A flush valve casing having an inlet portion and an outlet portion, a nipple having outside threads including a thread connected to and at least partially enclosed within the wall of said casing which defines said inlet portion, an extendible nipple-coupling having an inside thread engaging a thread on said nipple, and means for retaining said extendible nipple-coupling in a set position with respect to said inlet wall.

4. A flush valve casing having an inlet portion and an outlet portion, a nipple having outside threads including a thread connected to and at least partially enclosed within the wall of said casing which defines said inlet portion, said inlet casing wall having an aperture therein, an extendible nipple-coupling having an inside thread engaging a thread on said nipple, and means for retaining said extendible nipple-coupling in a set position with respect to said inlet wall, said retaining means comprising a set screw engaging the wall which defines an aperture in said inlet wall, said set screw having a projection extending therefrom and communicating with a recess formed in said nipple-coupling.

5. A flush valve casing having an inlet portion and an outlet portion, a nipple having an outside thread connected to and at least partially enclosed within the wall of said casing which defines said inlet portion, an extendible nipple-coupling having an inside thread engaging said nipple, said threads being laterally spaced at a predetermined distance with respect to each other, and means for retaining said extendible nipple-coupling in a set position with respect to said inlet wall.

6. A flush valve casing having an inlet portion and an outlet portion, a nipple connected to and at least partially enclosed within the wall of said casing which defines said inlet portion, an extendible nipple-coupling engaging said nipple, means for connecting said nipple-coupling to said nipple, sealing means connected between said nipple-coupling and said wall, a lug affixed to said extendible coupling to aid in the grasping of said coupling, and means for retaining said extendible nipple-coupling in a set position with respect to said inlet wall.

7. A flush valve casing having an inlet portion and an outlet portion, a nipple connected to and at least partially enclosed within the wall of said casing which defines said inlet portion, an extendible nipple-coupling engaging said nipple, means for connecting said nipple-coupling to said nipple, a resilient ring affixed to said coupling and contacting the inlet wall to form a seal thereof, and means for retaining said extendible nipple-coupling in a set position with respect to said inlet wall.

8. A flush valve casing having an inlet portion and an outlet portion, a nipple connected to and at least partially enclosed within the wall of said casing which defines said inlet portion, an extendible nipple-coupling engaging said nipple, means for connecting said nipple-coupling to said nipple, a lug affixed to said extendible coupling to aid in the grasping of said coupling, a resilient ring affixed to said coupling and contacting the inlet wall to form a seal thereof, and means for retaining said extendible nipple-coupling in a set position with respect to said inlet wall.

9. A flush valve casing having an inlet portion and an outlet portion, a nipple connected to and at least partially enclosed within the wall of said casing which defines said inlet portion, and extendible nipple-coupling engaging said nipple, means for connecting said nipple-coupling to said nipple, a lug affixed to said extendible coupling to aid in the grasping of said coupling, a resilient ring affixed to said coupling and contacting the inlet wall to form a seal thereof, an annular flange extending outwardly from said extendible coupling for retaining an inlet pipe coupling, an inlet pipe coupling retained by said flange, and means for retaining said extendible nipple-coupling in a set position with respect to said inlet wall.

10. A flush valve assembly for the passage of water which comprises a valve casing having an inlet portion and an outlet portion, valve means contained within said casing and connected thereto, means affixed to said casing for actuating said valve means, a nipple having an outside thread connected to and at least partially enclosed within the wall of said casing which defines said inlet portion, said inlet casing wall having an aperture therein, an extendible nipple-coupling engaging said nipple comprising a generally cylindrical body having an inside thread, an annular exterior groove on said body containing a sealing ring therein, a recess formed on the exterior of said body for receiving a set screw, an annular flange extending from said body for retaining an inlet pipe coupling, and a lug connected to the inside of said coupling body for enabling a positive grasp thereof, means for retaining said extendible nipple-coupling in a set position with respect to said inlet wall, said retaining means comprising a set screw engaging the wall which defines the aperture in said inlet wall, said set screw having a projection extending therefrom communicating with said extendible coupling recess.

11. A flush valve assembly for the passage of water which comprises a valve casing having an inlet portion and an outlet portion, valve means contained within said casing and connected thereto, means affixed to said casing for actuating said valve means, a nipple having an outside thread connected to and at least partilly enclosed within the wall of said casing which defines said inlet portion, said inlet casing wall having an aperture therein, an extendible nipple-coupling engaging said nipple comprising a generally cylindrical body having an inside thread, said threads being laterally spaced at a distance of about ⅛ inch from each other, an annular exterior groove on said body containing a sealing ring therein, a recess formed on the exterior of said body for receiving a set screw, an annular flange extending from said body for retaining an inlet coupling, and a lug connected to the inside of said coupling body for enabling a positive grasp thereof, means for retaining said extendible nipple-coupling in a set position with respect to said inlet wall, said retaining means comprising a set screw engaging the wall which defines the aperture in said inlet wall, said set screw having a projection extending therefrom communicating with said extendible coupling recess.

12. A flush valve casing having an inlet portion and an outlet portion, a nipple connected to and at least partially enclosed within the wall of said casing which defines said inlet portion, an extendible nipple-coupling engaging said nipple, means for connecting said nipple-coupling to said nipple, and sealing means connected between said nipple-coupling and said wall.

13. A flush valve casing having an inlet portion and an outlet portion, a nipple having an outside thread connected to and at least partially enclosed within the wall of said casing which defines said inlet portion, an extendible nipple-coupling having an inside thread and engaging said nipple, and sealing means connected between said nipple-coupling and said wall.

References Cited

UNITED STATES PATENTS

| | | | |
|---|---|---|---|
| 1,039,575 | 9/1912 | Mueller | 285—302 X |
| 1,570,155 | 1/1926 | Karbowski | 285—90 X |
| 1,868,520 | 7/1932 | Brooks | 251—38 |
| 1,987,366 | 1/1935 | Ford | 285—158 X |
| 2,484,755 | 10/1949 | Smith | 285—30 |
| 2,746,773 | 5/1956 | Bily | 285—90 X |
| 3,201,155 | 8/1965 | Billeter et al. | 251—40 X |

M. CARY NELSON, *Primary Examiner.*

A. ROSENTHAL, *Assistant Examiner.*